Aug. 4, 1931.   C. BIRDSEYE   1,817,890
REFRIGERATING APPARATUS AND METHOD OF REFRIGERATING FOOD PRODUCTS
Filed July 1, 1925   2 Sheets-Sheet 1
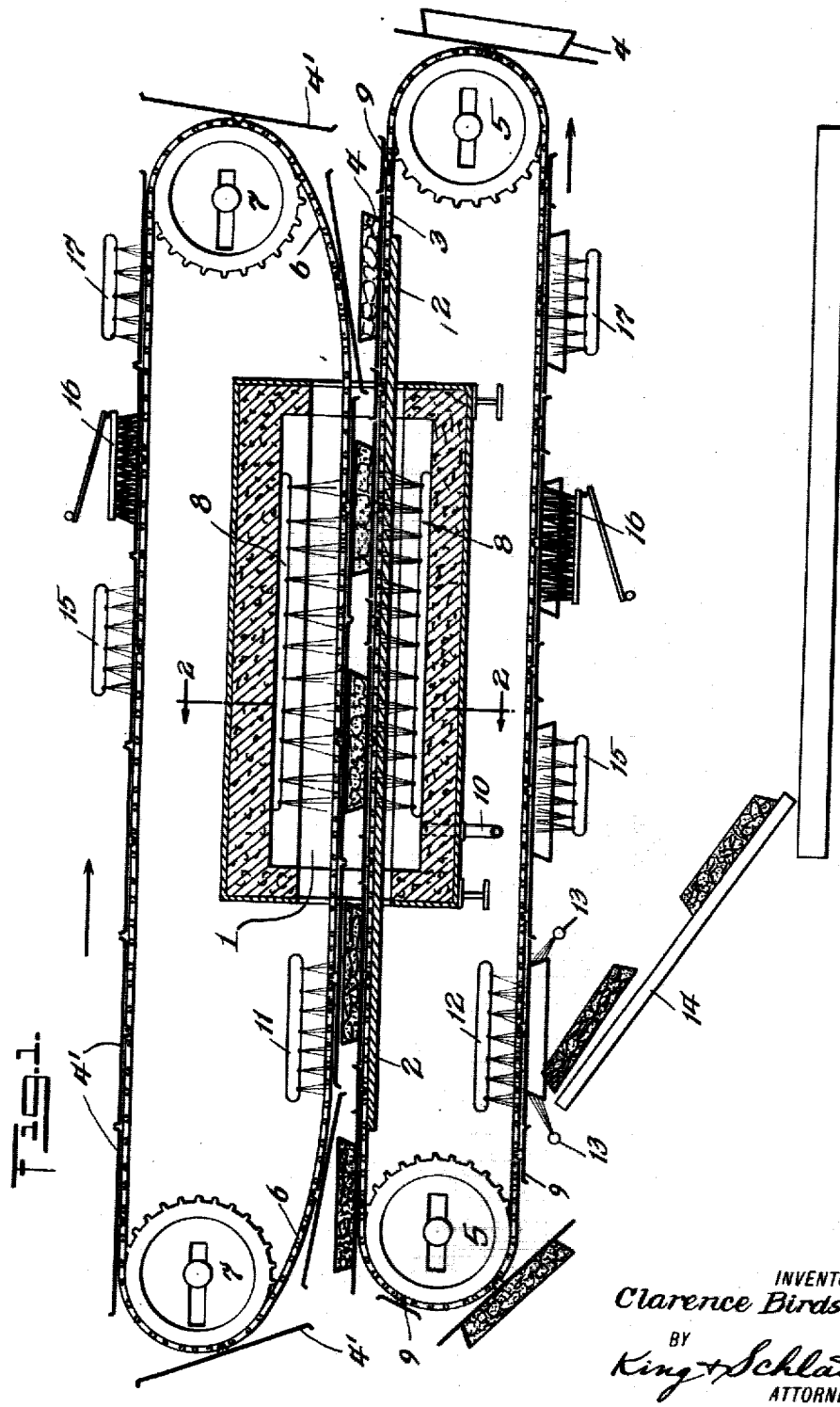
INVENTOR
Clarence Birdseye
BY
King + Schlatt
ATTORNEYS Aug. 4, 1931.  C. BIRDSEYE  1,817,890
REFRIGERATING APPARATUS AND METHOD OF REFRIGERATING FOOD PRODUCTS
Filed July 1, 1925  2 Sheets-Sheet 2
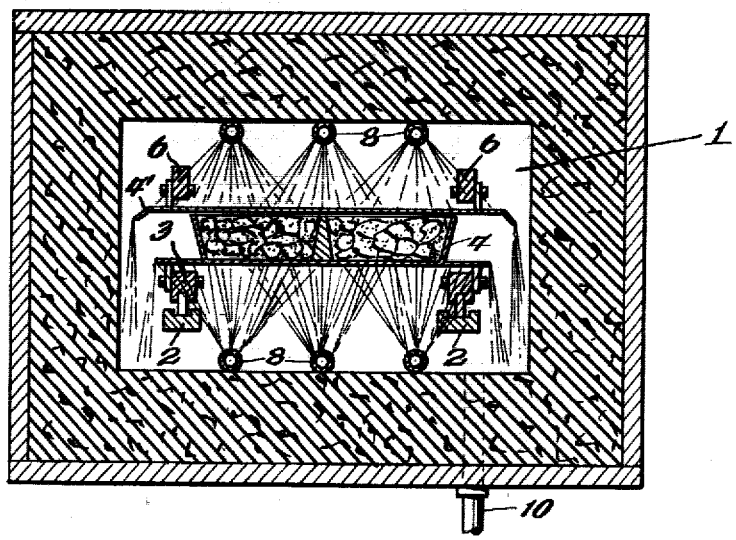
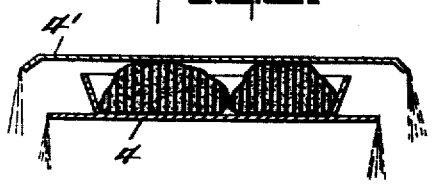
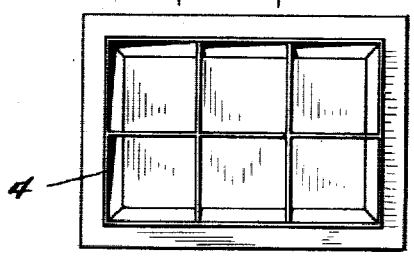
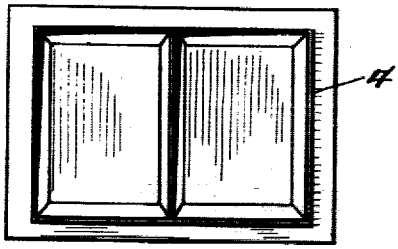
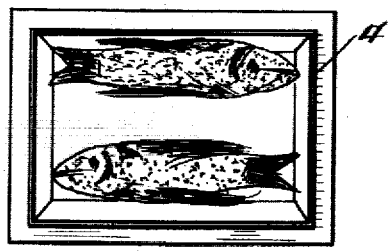
INVENTOR
Clarence Birdseye
BY
King + Schlatt
ATTORNEYS Patented Aug. 4, 1931

1,817,890

UNITED STATES PATENT OFFICE

CLARENCE BIRDSEYE, OF GLOUCESTER, MASSACHUSETTS, ASSIGNOR, BY MESNE ASSIGNMENTS, TO FROSTED FOODS COMPANY, OF DOVER, DELAWARE, A CORPORATION OF DELAWARE

REFRIGERATING APPARATUS AND METHOD OF REFRIGERATING FOOD PRODUCTS

Application filed July 1, 1925. Serial No. 40,726.

This invention relates to that type of refrigerating apparatus for refrigerating food products, such as ice cream bricks, eggs, butter and other dairy products, meats, vegetables, fish and other edibles, which require refrigeration for preservation or other purposes.

The objects of the invention are to provide an apparatus which will be adapted to use for refrigeration of a great variety of articles or food products, and adapted to accommodate various sizes and shapes of such articles either wrapped, unwrapped, individual, massed, in cartons or otherwise; to enable brine to be used as the refrigeration medium without contaminating the food products; to obtain such close association of the brine to the food product as to refrigerate the same quickly and thoroughly; to avoid strain on the heat extracting mechanisms; to reduce hand operations to a minimum and operate the apparatus automatically; to enable the food product to have metallic contact for more rapid conduction of the heat; to reduce heat absorption from the atmosphere to a minimum; to lessen evaporation during refrigeration; to secure simplicity of construction and operation; and to obtain other advantages and results as may be brought out in the following description.

Referring to the accompanying drawings in which like numerals of reference indicate similar parts throughout the several views:

Figure 1 is a view in longitudinal section of an apparatus embodying my invention and for carrying out the process of my invention;

Figure 2 is an enlarged section taken on the line 2—2 of Figure 1;

Figure 3 is a cross-sectional view through one of the pans and its cover;

Figure 4 is a plan view of one of the pans showing the same subdivided for receiving or forming small cakes or for receiving cartons or the like;

Figure 5 is a similar plan view showing the pan divided in halves, and

Figure 6 is a plan view of a pan showing individual fish therein.

In the specific embodiment of the invention illustrated in said drawings, the method and apparatus preferably employ means for passing a continuous train of suitable pans or containers through a refrigerating medium, at such speed that the food products in the pans will emerge properly refrigerated, uncontaminated by the refrigerating medium, and automatically discharging the refrigerated product from the pan and returning the pan for re-use. As one means of carrying out my invention, I provide an enclosure or chamber 1 suitably heat insulated through which extends a track 2 for a conveyor here shown as having chains 3 supported by the track and in turn supporting receptacles or pans 4 in which the food product to be refrigerated may be placed.

Said conveyor is continuous, passing around suitable wheels or sprockets 5, 5 beyond opposite ends of said enclosure 1 so as to pass the receptacles through the enclosure repeatedly in the same direction. For convenience the passage of the conveyor or receptacles through the enclosure 1 from one sprocket to the other will be referred to as the forward movement thereof and the passage back to the first mentioned sprocket will be referred to as the return movement thereof.

For the period of passage of the pans or receptacles through the enclosure 1, it constitutes one feature of my invention to automatically apply and retain a cover upon said pans. In order to accomplish this feature of the invention, I provide another or upper conveyor above the pan conveyor, said upper conveyor having covers 4' carried by chains 6 passing around sprockets 7, 7 beyond the opposite ends of said enclosure 1. Movement of this upper conveyor through the enclosure 1 is in the same direction and at the same rate of speed as the pan conveyor, and passage of the same from one sprocket 7 through the enclosure to the other sprocket is to be referred to as the forward movement and the return of the conveyor from the second sprocket to the first is to be referred to as the return movement.

The upper or cover conveyor is arranged to be loose enough for the portion thereof passing through the enclosure or chamber so as to seat the covers by gravity on the pans. This accordingly obtains a reasonably tight closure between the pan and cover as shown in Figures 1 and 2, or rests the cover directly on the food product, as in Figure 3, where the product is too deep for the pan.

Within enclosure 1 are provided spray pipes 8, some of which are shown above the upper conveyor and others below the lower conveyor, with openings to obtain a spray of brine therefrom directed toward the conveyors. By this arrangement the cold spray of brine is in direct contact with the pans and covers, and these preferably being metal readily transmit the heat of the food products in the pans, rapidly refrigerating the same. Obviously the degree of refrigeration may be varied by the temperature and quantity of brine employed, by the conductivity of the material of which the pans and covers are constructed, or by the mass and speed of the food product passing through.

As clearly shown in the drawings, I prefer to employ covers of materially greater length and width than the pans, and of such length that successive covers substantially meet. By such arrangement the spray will not pass to any great extent between the covers, thus preventing the same from splashing and getting in contact with the contents of the pan. The pans are also preferably provided with extending bottom portions to deflect and prevent splashing of the under spray. In this instance, I have shown filler plates 9 carried by the chains and positioned and proportioned to close the gap between the ends of the pans. The brine resulting from the under spray falls back after engagement with the bottom of the pans or fillers, and the brine resulting from the upper spray flows over the side edges of the cover, see Figures 2 and 3, and drops to the bottom of enclosure 1 where an outlet pipe 10 carries it away for discharge or reuse as desired. While I have referred to the refrigerating medium in the specific instance herein disclosed, as being brine, it is within the scope of the invention to use other means or refrigerating mediums, and to apply the same otherwise than by sprays.

After the pans and covers are sprayed or otherwise subjected to the effects of the refrigerating medium, as described, the usual application of the invention results in sufficient moisture of condensation and low enough temperature to cause the cover to freeze in place. The two conveyors are thereby kept in proper longitudinal association with each other, this freezing with respect to each other constituting or supplementing the driving means of one conveyor from the other. After leaving the confines of enclosure 1, the cover is disengaged from the pan or food product, it being preferable to provide a suitable means for thawing the cover loose. As one means for accomplishing this result, I have shown a spray pipe 11 above the covers from which may be emitted water, steam or other fluid of appropriate temperature to accomplish a release of the cover without materially affecting the temperature of the contents of the pan. The cover then automatically raises as the conveyors approach their respective sprockets and the pan is turned upside down as it starts the return movement. However, frozen condensation holds the contents within the pan, and I accordingly provide suitable means for thawing the contents loose from said pan. For this purpose, I accordingly show a spray pipe 12 above the pan and other pipes 13 below for directing a spray on the bottom and sides of the pan for releasing said contents, which thereupon drop out and onto any suitable delivery device 14 herein indicated as a chute.

Conveniently situated in the course of the return movement of both the pans and covers are sterilizer means 15, scrubbing means 16 and cooling means 17 of suitable construction. The pans and covers are accordingly returned to the forward moving portions of the cycle, properly sterilized, brushed and cooled ready for re-use.

It may here be noted that in this preferred form of the invention the pans and covers are attached removably at central pivoted points so as to be readily replaced when desired or needed. Furthermore, suitable adjustment for making the conveyor more or less tight is included as indicated, and power from any suitable source (not shown) is applied to actuate the conveyors.

The pans may be of suitable proportions to enable the contents to be frozen as a single cake, or to receive individual articles such as fish as shown in Figure 6, or may be provided with a middle partition as indicated in Figures 2 and 5 or a plurality of partitions as indicated in Figure 4. Other means than sprays may be substituted for the refrigerating, thawing or sterilizing. Variations of this nature, and in fact many modifications and changes neither shown or mentioned may be made without departing from the spirit or scope of the invention, and I do not wish to be understood as limiting myself to the exact structure or method shown except as set forth in the appended claims when construed in the light of the prior art.

In carrying out my improved method, the food products are placed in the pans during forward movement thereof before entry into enclosure 1, the covers are automatically applied, the closed pan is sprayed with a refrigerating solution to accomplish rapid refrigeration, the covers freezng on, the pans and covers pass out of enclosure 1, are thawed apart, the pan inverted and the contents released from the pan, the pan and cover being then prepared for re-use and automatically returned ready for such re-use.

In certain of its broader aspects my invention is claimed in U. S. Letters Patent No. 1,773,081, granted August 12, 1930 on an application which was copending herewith.

Having thus described my invention, I claim:—

1. A refrigerating apparatus having means for maintaining a spray of liquid cooling medium, together with means for conveying matter in containers within the range of the spray, said means providing a shield beneath said containers and a shield above said containers, both of said shields being of greater size than said containers for preventing access of the spray directly to said containers.

2. A refrigerating apparatus having means for maintaining a spray of liquid cooling medium, together with means for conveying matter in containers within the range of the spray, said means providing a shield beneath said containers larger than said containers, and a shield above said containers larger than the under shield and the container, so as to shed the spray clear of both the containers and the under shield.

3. Refrigerating apparatus comprising cooperating conveyors, one carrying a series of separate containers and the other a series of covers, the covers being so disposed as to form a substantially continuous shield, and means for flowing liquid cooling medium upon said covers while they act collectively to shield the series of containers.

4. Refrigerating apparatus comprising a series of container members spaced from each other and movable collectively, a series of separable cover members correspondingly located and of such size as to form a substantially continuous shield for the container members of the series, and means for flowing liquid cooling medium upon the shield thus formed.

5. A refrigerating apparatus comprising a conveyor having a closed container for advancing a product to be frozen along a predetermined path, means for flowing cooling medium upon the container during its movement through a portion of its path, and means for subjecting said container to the action of a thawing agent during its subsequent movement through an adjacent portion of its path.

6. A refrigerating apparatus comprising a refrigerating chamber having means therein for maintaining a spray of cooling medium, a conveyor having a closed container movable through said chamber, and means outside the chamber for subjecting said container to the action of a thawing agent.

7. A refrigerating apparatus comprising a refrigerating chamber having means therein for maintaining a spray of cooling medium, a conveyor having a closed container movable through said chamber and in a further path outside the chamber, means outside the chamber for applying a thawing medium to the container, and means acting subsequently for cleansing the container.

8. A refrigerating apparatus comprising a refrigerating chamber, a conveyor for the product to be frozen movable in an endless path through said chamber, means for directing a refrigerant into proximity to the product carried by the conveyor to freeze the product while the same is shielded from direct contact by the refrigerant, and means outside the chamber for pre-cooling the conveyor before it enters said chamber.

9. A refrigerating apparatus comprising a refrigerating chamber, a conveyor movable in an endless path through said chamber, means for cleansing the conveyor after it leaves said chamber, and means for pre-cooling the conveyor before it enters said chamber.

10. A refrigerating apparatus comprising a movable conveyor having a closed container for a product to be frozen, means for maintaining a spray of liquid cooling medium throughout a portion of the path of said conveyor, means for subjecting the container to a thawing spray after it leaves said chamber, and means for pre-cooling the container before it again enters said chamber.

11. A refrigerating apparatus comprising a refrigerating chamber, a conveyor carrying a closed container and arranged to move the container through said chamber in upright position and then to invert the container at a point outside the chamber, and means for applying a thawing agent to the inverted container.

12. The method of freezing food products which consists in completely enclosing the product in a pre-cooled imperforate envelope, and then applying a liquid cooling medium simultaneously to opposite sides of said envelope to absorb the heat conducted from the product by said pre-cooled envelope.

13. Apparatus of the class described, comprising a refrigerating chamber having means of refrigeration therein; a carrier arranged and adapted to enter and leave said chamber; a plurality of product-holding members on said carrier; and covers relatively movable with respect to said members.

14. Apparatus of the class described, comprising a refrigerating chamber having refrigerating sprays therein; a carrier arranged and adapted to enter and leave said chamber; a plurality of product-holding members on said carrier; and covers relatively movable with respect to said members.

15. Apparatus of the class described, comprising a refrigerating chamber having sprays of refrigerating brine therein; a carrier arranged and adapted to enter and leave said chamber; a plurality of product-holding members on said carrier; and covers arranged to be lowered upon said members to protect the product from the refrigerating spray, each cover extending beyond the edges of the holding member with which it is associated to shed the brine clear of the holding member.

CLARENCE BIRDSEYE.